No. 830,656. PATENTED SEPT. 11, 1906.
J. R. EZZELL.
WAGON BRAKE.
APPLICATION FILED JAN. 20, 1906.
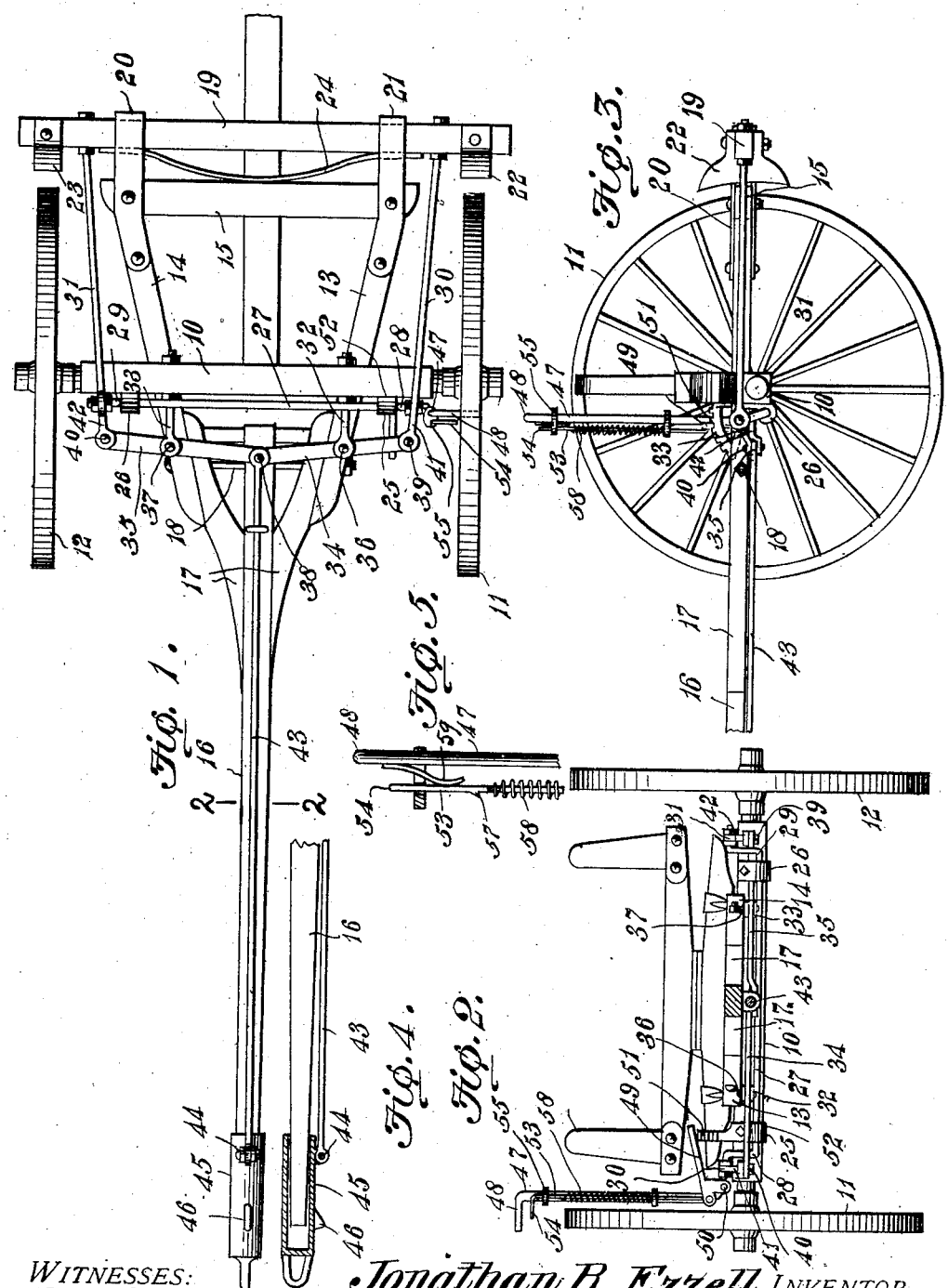
WITNESSES:
Jonathan R. Ezzell INVENTOR
By C. A. Snow & Co.
ATTORNEYS

UNITED STATES PATENT OFFICE.

JONATHAN RANDLE EZZELL, OF HUNTINGDON, TENNESSEE.

WAGON-BRAKE.

No. 830,656.  Specification of Letters Patent.  Patented Sept. 11, 1906.

Application filed January 20, 1906. Serial No. 297,067.

*To all whom it may concern:*

Be it known that I, JONATHAN RANDLE EZZELL, a citizen of the United States, residing at Huntingdon, in the county of Carroll and State of Tennessee, have invented a new and useful Wagon-Brake, of which the following is a specification.

This invention relates to wagon-brakes of the class wherein the brake mechanism is automatically operated by the backing of the team or by the forward movement of the wagon when going down a grade, and has for its object to improve and simplify the construction and increase the efficiency of devices of this character.

With these and other objects in view, which will appear as the nature of the invention is better understood, the invention consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation, it being understood that various changes in the form, proportions, and minor details of construction may be resorted to without departing from the principle or sacrificing any of the advantages of this invention within the scope of the appended claims.

Figure 1 is a bottom plan view of the forward running-gear and tongue of a wagon with the improved brake mechanism applied. Fig. 2 is a front elevation with the tongue in section on the line 2 2 of Fig. 1. Fig. 3 is a side elevation of the parts shown in Fig. 1 with one of the wheels removed. Fig. 4 is a sectional detail of the brake-actuating sleeve or ferrule. Fig. 5 is an enlarged detail of the locking mechanism of the brake-operating lever.

The improved device is applicable to the forward running-gear of any ordinary farm-wagon, and for the purpose of illustration is shown applied to a conventional structure of this class comprising the forward axle 10, having carrier-wheels 11 12, axle-hounds 13 14, having rear cross-bar 15, tongue 16, having the tongue-hounds 17 and pivoted by bolt 18 between the axle-hounds, all these parts being of the usual form.

Disposed rearwardly of the cross-bar 15 of the axle-hounds is a brake-beam 19, slidably supported relative the bar 15 by clips 20 21 and provided with brake-shoes 22 23 for engaging the wheels 11 12. The beam 19 is maintained yieldably in its outward position and the shoes 22 23 out of contact with the wheels by a spring 24 between the members 15 and 19 and preferably extending through the clips or keepers 20 21.

Attached to the forward face of the axle 10 are spaced bearing-brackets 25 26, through which a rock-shaft 27, having upturned ends 28 29, extends, the shaft thus being disposed beneath the axle-hounds. The upturned ends 28 29 of the shaft 27 form cranks and are coupled to the beam 19 by rods 30 31, the rocking of the shaft thus causing the operation of the brake-beam, as will be obvious.

Attached to the axle 10 are spaced brackets 32 33, in which levers 34 35 are pivoted at 36 37 and united at their inner ends by a pivot 38 and coupled at their outer ends at 39 40 to extensions 41 42 of the rods 30 31. A rod 43 is coupled at one end to the pivot 38 and extends beneath the tongue 16 and connected at 44 at the other end to a sleeve or ferrule 45, slidably disposed over the forward end of the tongue. The sleeve 45 takes the place of the usual tongue-cap and is provided with a depending lug 46, against which the ring on the neck-yoke bears. The neck-yoke is not shown, as its construction and operation are so well known. The force of the spring 24 maintains the brake-beam 19 in its rearward or inoperative position and also maintains the levers 34 35, rod 43, and sliding cap-ferrule 45 in their forward position.

When the wagon is running upon level ground, the brake mechanism remains inoperative; but when the wagon runs down grades, which require the team to hold back the vehicle, the pulling action exerted upon the neck-yoke draws the ferrule 45 rearwardly and causes the operation of the brake through the reverse action of the levers 34 35, rock-shaft 27, and rods 31 32.

The upturned end 28 of the shaft 27 is extended into a lever-arm 47, terminating in a handle 48, and with a lock-pawl 49, pivoted at 50 thereto, the pawl adapted to engage teeth 51 in a segmental arm extending from the bracket-hanger 25 and firmly secured at its free end at 52 to the axle 10. The outer end of the pawl 49 is provided with an operating-rod 53, terminating in a handle 54 and operating through a guide 55 on the lever-arm 47 and also provided with a spring 58, operating to yieldably maintain the pawl out of engagement with the toothed segment. The rod 53 is formed with a catch-lug 57, adapted to engage the guide 55 when the rod 53 is elevated, and thus lock the pawl in engagement with the toothed segment, the rod 53 having a spring 59 operating to maintain the same yieldably in its outer position.

When it is desired to lock the brake-beam in its open or inoperative position, the lever 47 is moved rearwardly and the locking-pawl set into the rearmost tooth in the segment, the action of operating the pawl by elevating the rod 53 causing the catch 57 to automatically engage the keeper or guide 55 and hold the pawl in its locked position. When it is desired to lock the brake-beam in closed position or with the shoes 22 23 bearing against the wheels 11 12, the lever-arm 47 is moved forwardly and locked in position in the same manner, with the pawl engaging the foremost tooth in the segmental members. Thus the brake may be operated in the same manner as an ordinary brake mechanism and independently of the operation of the ferrule 45 and rod 16 with the system of levers, rock-shaft, and rod, as will be obvious.

Having thus described the invention, what is claimed is—

1. The combination with the running-gear of a wagon, including the forward wheels and draft-tongue, of a brake-beam having shoes for bearing upon said wheels, a rock-shaft carried by said running-gear and with cranks at the ends, rods between said cranks and brake-beam, levers pivoted intermediate their ends to said running-gear and pivotally united at their outer ends to said cranks, a sleeve slidable upon said tongue and having means for supporting a neck-yoke, and a rod connected between said sleeve and the inner ends of said levers.

2. The combination with the running-gear of a wagon, including the forward wheels and draft-tongue, of a brake-beam having shoes for bearing upon said wheels, a rock-shaft carried by said running-gear and with cranks at the ends, rods between said cranks and brake-beams, levers pivoted intermediate their ends to said running-gear and pivotally united at their outer ends to said cranks, a sleeve slidable upon said tongue and having means for supporting a neck-yoke, a rod connected between said sleeve and the inner ends of said levers, a lever-arm extending from said rock-shaft, and means for locking said lever-arm in position.

3. The combination with the running-gear of a wagon, including the forward wheels and draft-tongue, of a brake-beam having shoes for bearing upon said wheels, a rock-shaft carried by said running-gear and with cranks at the ends, rods between said cranks and brake-beams, levers pivoted intermediate their ends to said running-gear and pivotally united at their outer ends to said cranks, a sleeve slidable upon said tongue and having means for supporting a neck-yoke, a rod connected between said sleeve and the inner ends of said levers, a lever-arm extending from said rock-shaft, a toothed segment carried by said running-gear, a pawl carried by said lever-arm for engaging the teeth of said segment one at a time, and means carried by said lever-arm for operating said pawl.

In testimony that I claim the foregoing as my own I have hereto affixed my signature in the presence of two witnesses.

JONATHAN RANDLE EZZELL.

Witnesses:
S. E. HEARNE,
G. D. McKENZIE.